Dec. 15, 1959     N. B. RITCHEY     2,917,688

CAPACITOR

Filed Sept. 17, 1957

INVENTOR.
NORMAN B. RITCHEY
BY
Theodore Jay Jr.
ATTORNEY

United States Patent Office 2,917,688
Patented Dec. 15, 1959

2,917,688

CAPACITOR

Norman B. Ritchey, Huntington Station, N.Y., assignor, by mesne assignments, to Sylvania Electric Products Inc., Wilmington, Del., a corporation of Delaware Application September 17, 1957, Serial No. 684,571

3 Claims. (Cl. 317—261)

My invention is directed toward capacitors having low inductance.

Low inductance capacitors find a wide range of applications in the electronic arts, particularly when high frequency pulses of narrow width are to be stored and rapidly discharged. Such applications require that the capacitors have a high C/L ratio where C is the capacitance and L is the inducance of the capacitor.

It is an object of my invention to provide a new and improved capacitor in which inductance is minimized and yet the total capacitance attains a high fixed value.

Another object is to decrease the inductance of a capacitor.

Still another object is to increase the C/L ratio of a capacitor.

These and other objects of my invention will either be explained or will become apparent hereinafter.

In accordance with the principles of my invention, a plurality of generally disc-shaped elements are stacked adjacent each other into a toroidal or doughnut-shaped structure. Certain of these elements are electrically conductive electrodes, the remaining elements are electrically non-conductive electrode separators having a high dielectric constant, the electrodes and separators being alternately interleaved thus forming a plurality of capacitor sections.

First and second vertically displaced electrically conductive contact members, as for example rings, are disposed within the opening in the toroid structure. The even numbered electrodes are electrically connected in common to the first ring; the uneven numbered electrodes are electrically connected in common to the second ring.

In this arrangement, the total capacitance of the structure represents the sum of the capacitances of each capacitor section, since the sections are electrically connected in parallel. Further, the total inductance of the system is equal to the inductance of a section divided by the number of sections, due to the above mentioned parallel connection.

Moreover, since the electrodes are narrow and closely spaced and since the current in adjacent electrodes travels in opposite directions, the inductance of each section is extremely low. Hence, the C/L ratio of this structure is inherently high.

If desired, the first and second rings can be coupled to the outer and inner conductors of a co-axial transmission line to permit the characteristic impedance of the capacitor to be matched to the impedance of an external load.

Figure 1:
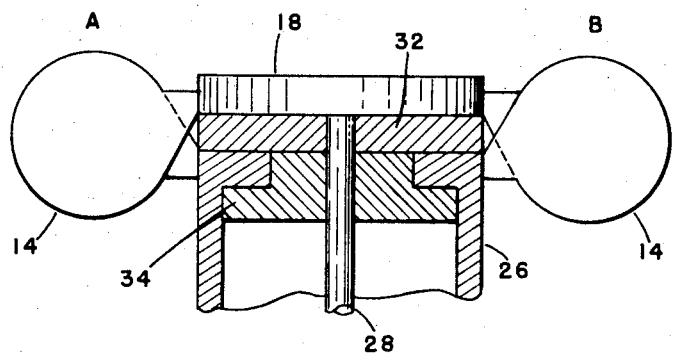
Figure 2:
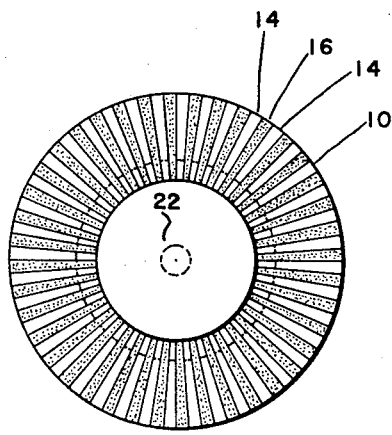

My invention will now be described with reference to the accompanying drawings wherein:

Fig. 1 is a cross sectional view of an illustrative embodiment of my invention; and Fig. 2 is a top view of the embodiment of Fig. 1.

Referring now to the drawings, a plurality of generally disc-shaped elements are stacked adjacent each other into a toroidal or doughnut-shaped structure 10. Certain of these elements are electrically conductive electrodes 14 formed, for example, of copper or aluminum, the remaining elements are electrically non-conductive electrode separators 16 having a high dielectric constant and formed, for example, of polystyrene or barium titanate. The electrodes 14 and separators 16 are altenately interleaved in structure 10, the electrodes and separators being secured to each other through the use of known bonding techniques as, for example, compression strapping, gluing, potting in plastic, or the like.

First and second separate, electrically conductive contact members, in this example rings 18 and 32, are separately disposed one above the other in the opening 22 of structure 10.

The even numbered electrodes 14 are electrically connected in common to ring 18, as for example being soldered thereto, the odd numbered electrodes are electrically connected in common to ring 32.

A coaxial line 34, having an outer conductor 26 and an inner conductor 28 is coupled to the structure, conductor 26 being coupled to ring 32, while conductor 28 is coupled to ring 18.

While I have shown and pointed out my invention as applied above, it will be apparent to those skilled in the art that many modifications can be made within the scope and sphere of my invention as defined in the claims which follow.

What is claimed is:

1. A capacitor comprising a plurality of generally disc-shaped elements stacked adjacent each other and extending radially about an axis to form a generally toroidal-shaped structure, certain of said elements being electrically conductive electrodes, the remaining elements being electrically non-conductive electrode spacers having a high dielectric constant, said electrodes and said spacers being alternately interleaved; first and second separate, electrically conductive contact members both entirely disposed one above the other in the opening of said toroid, the odd numbered electrodes being electrically connected in common to said first member, the even numbered electrodes being electrically connected in common to said second member.

2. In combination, a capacitor comprising a plurality of generally disc-shaped elements stacked adjacent each other and extending radially about an axis to form a generally toroidal-shaped structure, certain of said elements being electrically conductive electrodes, the remaining elements being electrically non-conductive electrode spacers having a high dielectric constant, said electrodes and said spacers being alternately interleaved; first and second separate, electrically conductive contact members both entirely disposed one above the other in the opening of said toroid, the odd numbered electrodes being electrically connected in common to said first member, the even numbered electrodes being electrically connected in common to said second member; and a coaxial line having outer and inner conductors respectively connected electrically to said corresponding first and second members of said capacitor.

3. A capacitor comprising a plurality of generally disc-shaped elements stacked adjacent each other and extending radially about an axis to form a generally toroidal-shaped structure, certain of said elements being electrically conductive electrodes, the remaining elements being electrically non-conductive electrode spacers having a high dielectric constant, said electrodes and said spacers being alternately interleaved; first and second separate, electrically conductive contact members both entirely disposed one above the other in the opening of said toroid; means electrically connecting all of the odd numbered electrodes to said first member; and means electrically connecting all of the even numbered electrodes to said second member.

References Cited in the file of this patent

UNITED STATES PATENTS

| | | |
|---|---|---|
| 1,768,416 | Nyman | June 24, 1930 |
| 2,550,308 | Sporing | Apr. 24, 1951 |
| 2,789,259 | Eisler et al. | Apr. 16, 1957 |

FOREIGN PATENTS

| | | |
|---|---|---|
| 1,136 | Great Britain | 1905 |
| 346,731 | Great Britain | Oct. 10, 1929 |